United States Patent [19]

Ayers

[11] 4,420,453

[45] Dec. 13, 1983

[54] METHOD OF MAKING POLYESTER CORD RADIAL TIRES

[75] Inventor: Myron T. Ayers, Akron, Ohio

[73] Assignee: The General Tire & Rubber Company, Akron, Ohio

[21] Appl. No.: 177,710

[22] Filed: Aug. 13, 1980

[51] Int. Cl.$^3$ .............................................. B29C 25/00
[52] U.S. Cl. ................................................... 264/502
[58] Field of Search ......................................... 264/502

[56] References Cited

U.S. PATENT DOCUMENTS

| | | | |
|---|---|---|---|
| 3,039,839 | 6/1962 | Waters et al. | 264/502 |
| 3,120,571 | 2/1964 | Wolfer | 264/502 |
| 3,529,048 | 9/1970 | Kovac et al. | 264/502 |
| 3,632,701 | 1/1972 | Devitt et al. | 264/502 X |
| 3,792,145 | 2/1974 | Hagger et al. | 264/502 |
| 3,956,443 | 5/1976 | Schichman | 264/502 |

Primary Examiner—Jan H. Silbaugh

[57] ABSTRACT

Tires made using polyester cord in the fabric plies are built in a conventional manner, cured in a conventional manner in a curing press, removed from the curing press and held in an uninflated state for a length of time sufficient for the tire to cool to 300° F. (149° C.), then post inflated. The tires remain in the inflated state until the temperature has been reduced below 90° C. The cords in the tires which have been subjected to the post inflation treatment of the present invention have less tendency for sidewall waviness than tire which have been post inflated out of the mold immediately after curing and without being subjected to cooling water in the bladder. Also the cooling period outside the mold has been found to be as successful in solving the sidewall waviness problem as the injection of cooling water into the bladder for 2 minutes at the end of the cure cycle.

1 Claim, No Drawings

METHOD OF MAKING POLYESTER CORD RADIAL TIRES

This invention is directed to a method of making tires having their fabric layers made of polyester cord. More specifically, the invention relates to the post-cure inflation of polyester cord tires and to the timing of this post-cure inflation step after the tire has been removed from the curing press.

Tires made with polyester cord have the advantages of being of lighter weight and higher strength than cotton or rayon cord tires, and they do not take a set on standing like nylon tires with their resulting thump when they start rolling. However, polyester cord tires have had problems of their own.

One of these problems is that the polyester cord in the tire sidewall tends to stretch unevenly while the tire is in service or during manufacture. This phenomenon results in wavy sidewalls making it difficult to align a car, because toe-in is measured from sidewall to sidewall. The problem of wavy sidewalls is particularly acute in single ply tires.

In the normal manufacture of one ply radial polyester tires, the tires are manufactured undersize, then post-cure inflated to bring them up to specification dimensions. This post-cure inflation reduces the tendency of cord made of polyester and other synthetic fibers to shrink when the tire is deflated, and to stretch when the tire is in service. Such shrinking and stretching tendencies have been responsible for a number of problems with such tires such as cracks in the rubber in the bases of the grooves, and distortions in the shape of the tire. Apparatus for post-cure inflating tires to solve such problems is shown in U.S Pat. Nos. 3,002,228 Salem, et al (1961); 3,008,180 Woodhall (1961); 3,039,839 Waters, et al (1961); 2,978,741 Soderquist (1961); and 3,487,507 Turk (1970).

However, post-cure inflation described in the foregoing patents has been found to aggravate the problem of sidewall waviness in polyester cord tires. One solution to the problem has been to inject cooling water into the bladder for about two minutes at the end of the curing cycle, to reduce the temperature of the polyester cord when the tire is inflated after curing. However, this additional cooling step in the mold has been found to be expensive in that it requires energy to supply the large amounts of cooling water needed, and also because the number of tires that can be produced in each mold is significantly reduced by the two minutes added to the curing cycle for each tire.

The present invention is based upon the discovery that this waviness of the sidewall of polyester cord tires can also be significantly reduced if a time delay is employed between the curing of the tire in the curing press and post-cure inflation of the tire. The length of the time delay is critical and should correspond to the time that it takes for the temperature of the polyester and cord underneath the tread shoulder to fall from its curing temperature (about 35° F. to 345° F. or 168° C. to 173° C.) down to 300° F. (149° C.). Such time will, of course, vary depending on the size and construction of the tire, and will fall within a range of 3 to 9 minutes.

Imposing a time delay between the curing of a tire and the post-cure inflation of the tire is disclosed in U.S. Pat. No. 4,174,242, issued to Ayers and Corsaut and assigned to The General Tire & Rubber Company. However, the tires in that case were made with nylon cord, and the purpose of the time delay was to improve the break-strength of the nylon cord. The inventor of the present invention is a co-patentee of that patent. The method taught in the patent was tried for polyester cord, but was rejected because it was found that the method did not improve the break-strength of the polyester cord as it did the nylon cord. The problem of solving the sidewall waviness problem with polyester cord tires was not of concern in making the invention disclosed and claimed in U.S. Pat. No. 4,172,242.

The object of the present invention is to provide a method of curing and post-cure inflating polyester cord tires that will avoid the formation of depressions in the sidewalls of the tires, yet will not require addition curing cycle time for the tires in their molds, or the use of an energy wasting cooling medium. According to the invention, the tires are held in an uninflated state outside the curing molds until their polyester cords underneath their tread shoulders cool to 300° F.±5° F., before the tires are post-cure inflated. This delay allows the modulus of elasticity of the polyester cords to increase so that their stretching during the post-cure inflation is more controlled and uniform, yet the polyester cord is still above its heat shrink temperature so that the post-cure inflation will do the job of bringing the tire up to its specified dimensions with the cords being less prone to shrinkage and stretch while the tire is being used.

In the practice of the present invention, all of the process steps and all of the equipment is conventional with the exception of the time delay between the curing of the polyester tire in the mold and the post-cure inflation step.

The conventional steps comprise curing a polyester cord radial tire under heat and pressure in a mold then post inflating the tire outside of the mold to a pressure of at least 170 kilopascals before the tire cools below a temperature of 200° F. (94° C.). The inventive step of the process comprises a delay between the removal of the tire from the mold and the post-cure inflation of the tire, sufficient to allow the polyester cords of the tire to fall to within 5° F. of 300° F. (149° C.). It is advisable that this time be determined for each different tire size and construction by inserting a temperature probe in a sample tire in the shoulder area, so that the probe measures the temperature of the polyester cord underneath the tread shoulder. Then, a measurement can be taken of the time elapsing between removal of the tire from the mold and the temperature registered by the probe reaching 300° F. (149° C.).

Allowing the polyester cord to cool to a temperature at or very close to 300° F. (149° C.) allows the modulus of elasticity of the cord to increase dramatically from its modulus at 350° F. (176° C.). For instance, DuPont's T-68 polyester has a modulus of only 2.2 gpd at 350° F. (176° C.), but a modulus of 5.7 gpd at 300° F. (149° C.). With the modulus of elasticity so increased, it has been found that the subsequent post-cure inflation step results in a much more uniform stretching of the polyester cord, yet at 300° F. (149° C.) the polyester cord still can be stretch enough during the post-cure inflation to give it the desired stability and resistance to stretch and shrinkage while the tire is in service.

The tire molds used in the practice of the present invention are also conventional and can be operated in the well-known Bag-O-Matic Vulcanizers illustrated in Soderquist U.S. Pat. No. 2,715,245. The Bag-O-Matic Vulcanizers are sold by the McNeil Machine and Engineering Company of Akron, Ohio. Other vulcanizers, such as the Auto Form Vulcanizers manufactured by NRM Corporation of Akron, Ohio may also be used.

In the practice of the present invention it is preferred, although not an absolute requirement, that during the delay and the cooling period that the tread and sidewalls of the tire be free of and out of contact with any support or element which would prevent the tire from assuming and holding its fully rounded shape during the cooling period. It is also preferred that the tire be supported solely by the inextensible bead edges of the tire. Apparatus for accomplishing this support is shown in U.S. Pat. Nos. 2,978,741 of Soderquist; 3,002,228 of Salem, et al; and 3,039,839 of Waters, et al.

While it is preferred that the tire treads and sidewall be free of contact with support, it is not critical nor necessary for the practice of the present invention. In the conventional post-cure inflation step the tire can be inflated to a pressure of from 170 to 500 kilopascals and preferably the tire is inflated to a pressure of from 170 to 350 kilopascals. The post-cure inflation pressure is preferably maintained within the tire until the tire carcass cools to an average temperaure of from 10° to 100° C. and preferably from 20° to 80° C.

In order to determine the time delay before post-cure inflation for General Tire's P 185/80R-13 Dual Steel III passenger tire, a number of samples of such tires equipped with temperature sensing probes, were first cured in a conventional curing press. At the completion of the cure, each tire was taken out of the mold and the time it took for the temperature registered by the probe to fall to 300° F. (149° C.) was measured and was found to be 4.5 minutes. Because of the temperature probes, these tires of course could not be used.

Tires without temperature probes, suitable for use on automobiles, were then cured using a conventional curing cycle, with an injection of steam into the bladder, followed by high pressure hot water. Usually, there was no cold water circulated through the bladder at the end of the cycle except that occasionally, a cold water injection for no more than 12 seconds is necessary to alleviate a bladder "puffing" situation, in which the bladder tends to stick to the inside of the tire, or interfere with removal of the cured tire from the mold. This 12 second cold water injection, however, does not appreciably change the temperature of the tire when it comes out of the mold.

The tires were then stored for 4.5 minutes each, in accordance with the time required for cooling the polyester cord to 300° F. (149° C.) as determined by the previous testing with tires equipped with temperature probes. Following this delay, the tires were inflated on a post-cure inflator at a pressure of 350 kilopascals. Subsequent tests showed that the sidewall waviness was not noticeable and that the sidewall appearance was comparable to that of polyester cord tires made using a 2 minute cold water injection at the end of the cure cycle and a post-cure inflation performed only 45 seconds after removal from the press.

While only one embodiment of the present invention has been thus described, other embodiments and modifications will of course be apparent to those skilled in the art, while remaining within the scope of the appended claims.

I claim:

1. A method of making a polyester cord tire including the curing of the tire under heat and pressure in a mold at a curing temperature of at least 335° F. (168° C.) and then post-cure inflating the tire outside the mold to a pressure of at least 120 kilopascals before the tire cools below the heat shrink temperature of the polyester cord, wherein the improvement comprises a time delay between said curing of the tire in a mold and said post-cure inflation, the length of said time delay being such as to allow the temperature of the polyester cords in said tire underneath the tread shoulder portions of the tire to fall to between 295° F. and 305° F. (146° C. to 152° C.).

* * * * *